United States Patent [19]

Munakata et al.

[11] Patent Number: 4,821,989
[45] Date of Patent: Apr. 18, 1989

[54] SEAT SLIDE DEVICE

[75] Inventors: Kiyohiko Munakata, Yokohama; Yuji Tanaka; Isamu Chinomi, both of Kanagawa, all of Japan

[73] Assignees: Ikeda Bussan Co., Ltd., Ayase; Ohi Seisakusho Co., Ltd., Yokohama, both of Japan

[21] Appl. No.: 211,701

[22] Filed: Jun. 27, 1988

[30] Foreign Application Priority Data

Aug. 17, 1987 [JP] Japan .............................. 62-125063[U]

[51] Int. Cl.⁴ ............................................. F16N 13/00
[52] U.S. Cl. ........................................ 248/430; 384/47
[58] Field of Search ............... 248/430, 429, 424, 420; 384/48, 47

[56] References Cited

U.S. PATENT DOCUMENTS

| | | | |
|---|---|---|---|
| 4,378,101 | 3/1983 | Kazaoka et al. | 248/430 X |
| 4,526,424 | 7/1985 | Korth | 248/430 X |
| 4,635,890 | 1/1987 | Matsuda et al. | 248/429 |
| 4,660,795 | 4/1987 | Ikegaya et al. | 248/430 |
| 4,673,215 | 6/1987 | Yokoyama | 248/429 X |
| 4,725,032 | 2/1988 | Kazaoka et al. | 248/430 |
| 4,742,983 | 5/1988 | Nihei | 248/428 |

FOREIGN PATENT DOCUMENTS 59-134031 8/1984 Japan .

Primary Examiner—Ramon O. Ramirez
Attorney, Agent, or Firm—Foley & Lardner, Schwartz, Jeffery, Schwaab, Mack, Blumenthal & Evans

[57] ABSTRACT

A seat slide device is disclosed which comprises a stationary rail securely mounted on a fixed member; a movable rail slidable on and along the stationary rail while keeping an interlocking engagement with the stationary rail, the movable rail mounting thereon a set and slidable to a given position wherein a longitudinal end portion of the movable rail is projected considerably from a corresponding end of the stationary rail; a leg member having one end secured to the corresponding end of the stationary rail and the other end secured to the fixed member; and a structure defined by the leg member, the structure having a projected portion which is placed above the longitudinal end portion of the movable rail when the movable rail comes to the given position.

11 Claims, 3 Drawing Sheets

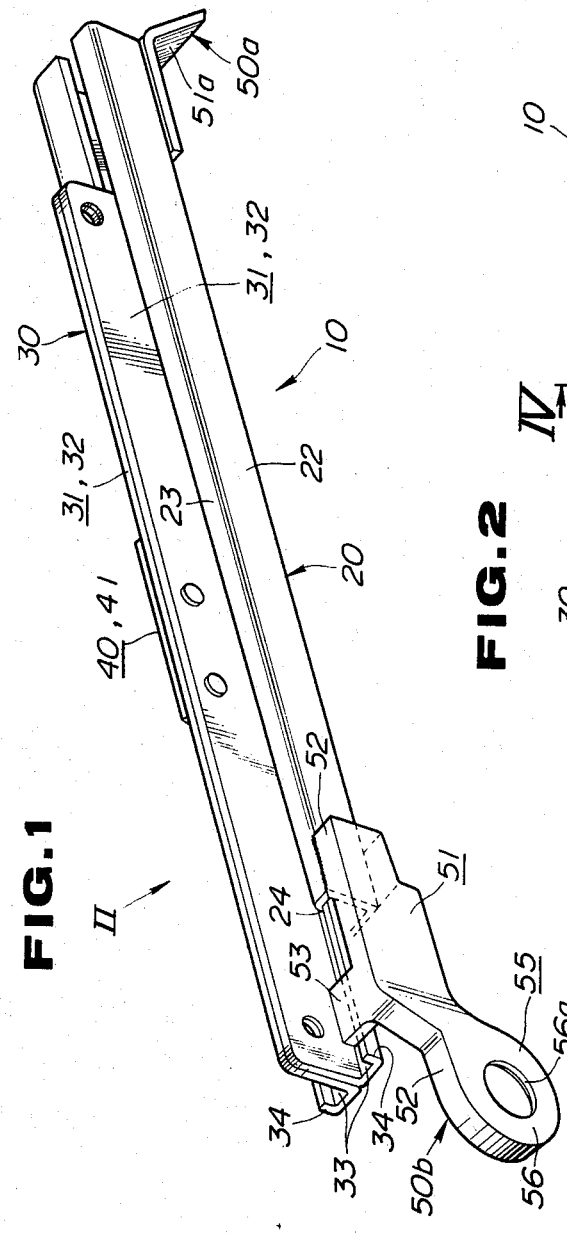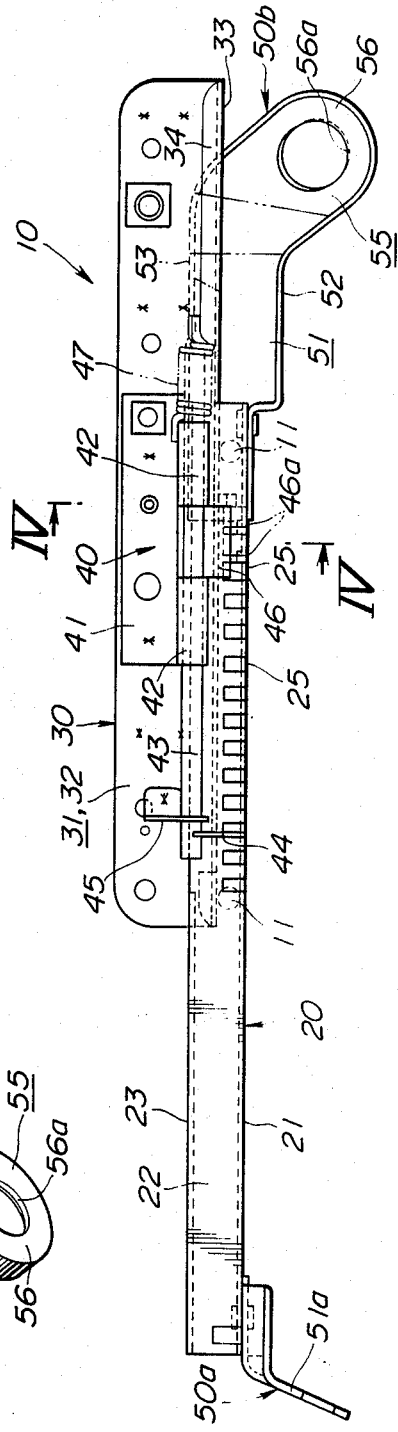
FIG.1
FIG.2

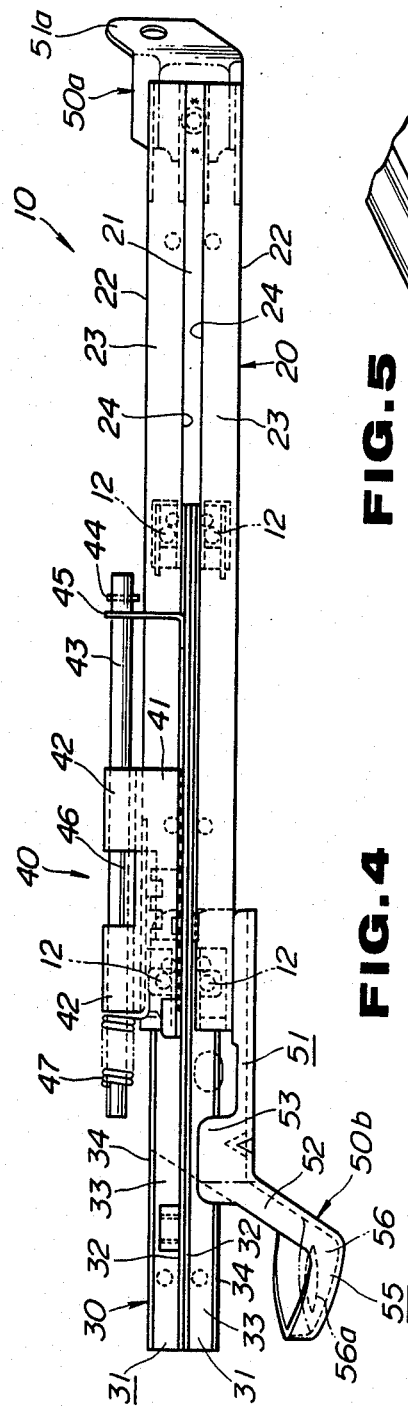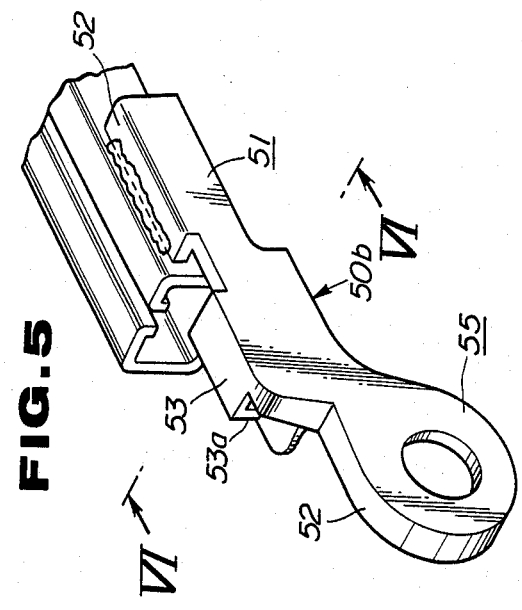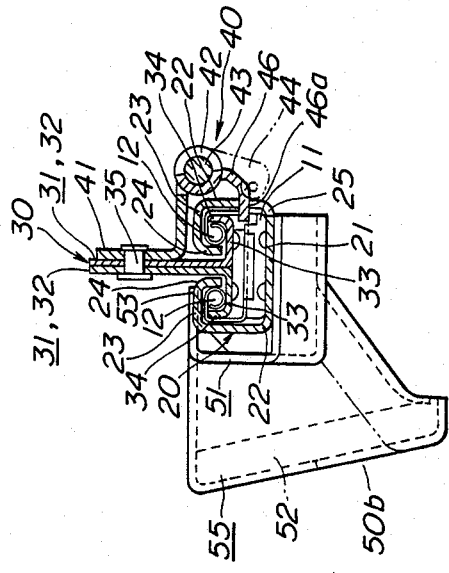

SEAT SLIDE DEVICE

BACKGROUND OF THE INVENTION

1. Field of the Invention

The present invention relates to a seat slide device of a motor vehicle, which device slides a seat to a desired position and locks the same at the desired position. More specifically, the present invention relates to a seat slide device which is equipped with a rail-coupling reinforcing structure for protecting the seat slide device from damage even when the same is applied with an abnormally big shock, due to a vehicle collision or the like.

2. Description of the Prior Art

Most of the seat slide devices hitherto proposed are of a type which comprises two stationary rails mounted on a vehicle floor, two movable rails slidably carried on the stationary rails and mounting thereon a seat, and a position locking mechanism for locking the movable rails at a desired position relative to the stationary rails. For increasing the mechanical strength, some of them are equipped with a so-called "rail-coupling reinforcing structure" which is designed to assure the functional connection between the stationary and movable rails which are coupled. Thus, the seat slide devices equipped with the rail-coupling reinforcing structure can exhibit a considerable resistance against a big shock applied thereto due to a vehicle collision or the like. One of the seat slide devices of this type is disclosed in Japanese Patent First Provisional Publication No. 59-134031.

The rail-coupling reinforcing structure disclosed by the Publication comprises an elongate plate which extends along one of the stationary rails and is secured thereto. The plate has mounting lugs secured to the vehicle floor and has at its upper end a folded-back channel portion which extends therealong. A generally L-shaped holding bracket is secured to the corresponding movable rail and slidably interconnected with an edge of the channel portion of the elongate plate. When, due to a vehicle collision or the like, the movable rail is applied with an abnormally big shock in a direction away from the stationary rail, the L-shaped holding bracket become tightly engaged with the edge of the channel portion thereby suppressing disengagement between the coupled two rails.

However, due to its inherency in construction, the rail-coupling reinforcing structure has caused a bulky and heavy construction of the seat slide device to which the reinforcing structure is practically applied. As is known, the bulky and heavy construction brings about not only poor space saving of the vehicle cabin but also deterioration in fuel consumption of the motor vehicle.

SUMMARY OF THE INVENTION

It is therefore an object of the present invention to provide a seat slide device with a rail-coupling reinforcing structure which is compact in size and light in weight.

According to the present invention, there is provided a seat slide device which comprises a stationary rail securedly mounted on a fixed member; a movable rail slidable on and along the stationary rail while keeping an interlocking engagement with the stationary rail, the movable rail mounting thereon a seat and slidable to a given position wherein a longitudinal end portion of the movable rail is projected considerably from a corresponding end of the stationary rail; a leg member having one end secured to the corresponding end of the stationary rail and the other end secured to the fixed member; and a structure defined by the leg member, the structure having a projected portion which is placed above the longitudinal end portion of the movable rail when the movable rail comes to the given position.

BRIEF DESCRIPTION OF THE DRAWINGS

Other objects and advantages of the present invention will become apparent from the following description when taken in conjunction with the accompanying , in which:

FIG. 1 is a perspective view of a seat slide device which is a first embodiment of the present invention;

FIG. 2 is a view taken from the direction of the arrow "II" of FIG. 1;

FIG. 3 is a plan view of the seat slide device;

FIG. 4 is a sectional view taken along the line "IV—IV" of FIG. 2;

FIG. 5 is a partial perspective view of a seat slide device which is a second embodiment of the present invention;

DETAILED DESCRIPTION OF THE INVENTION

Figure 6:
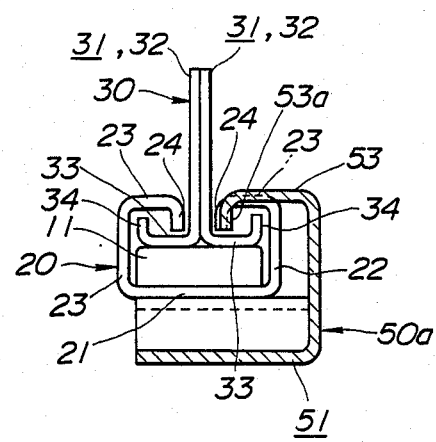
FIG. 6 is a sectional view taken along the line "VI—VI" of FIG. 5.

In the following, embodiments of the present invention will be described in detail with reference to the accompanying drawings in which like parts and constructions are denoted by the same numerals.

Referring to FIGS. 1 to 4, thee is shown a seat slide device of a first embodiment of the present invention.

The device of this embodiment comprises two elongate units only one 10 of which is illustrated in the drawings because the units are substantially the same in construction. These elongate units 10 are arranged on a vehicle floor (not shown) and extend in parallel along a longitudinal axis of the vehicle.

Each elongate unit 10 comprises a stationary rail 20 fixed to the vehicle floor, a movable rail 30 slidably carried on the stationary rail 20 and mounting thereon a seat (not shown), and a slider mechanism interposed between the two rails 20 and 30 to smoothly move the movable rail 30 on the stationary rail 20. As will be described in detail hereinafter, the slider mechanism comprises roller bearings 11 and ball bearings 12. Each unit 10 further comprises a lock mechanism 40 and front and rear leg members 50a and 50b which will be also described in detail hereinafter.

As is seen from FIGS. 1 and 4, the stationary rail 20 is of a channel member which comprises a bottom wall 21, opposed side walls 22, upper walls 23 defining therebetween an axially extending slot, and flanges 24 inwardly projected from the upper walls 23 toward the bottom wall 21. As is seen from FIG. 2, one of the side walls 22 is formed with a plurality of notches 25.

The movable rail 30 comprises two identical rail pieces 31 each having a generally L-shaped cross section. As is seen from FIG. 4, these rail pieces 31 are connected to each other in a back-to-back manner. That is, each rail piece 31 comprises a major base part 32, a lower wall 33 and a flange 34 upwardly projected from the lower wall 33. Thus, when connected, they constitute a unit having a generally T-shaped cross section.

As is understood from FIG. 4, the movable rail 30 is engaged with the stationary rail 20 in such a manner that the lower walls 33 and the flanges 34 of the movable rail 30 are received in the stationary rail 20. As is seen from FIGS. 2 and 4, roller bearings 11 are interposed between the bottom wall 21 of the stationary rail 20 and the lower walls 33 of o the movable rail 30. As is seen from FIGS. 3 and 4, ball bearings 12 are received in respective clearances each being defined by the upper wall 23 of the stationary rail 20 and the flange 24 of the same and the lower wall 33 of the movable rail 30 and the flange 34 of the same.

The lock mechanism 40 comprises a base bracket 41 which is secured by rivets 35 to the movable rail 30 to move therewith. As is well seen from FIGS. 3 and 4, the base bracket 41 is formed with two spaced curled edge portions 42 which constitute aligned bores (no numeral) through which an operation shaft 43 is inserted in a manner to rotate about the axis thereof. As is seen from FIGS. 2 and 3, and the operation shaft 43 has at its forward end a lever 44 secured thereto. Designated by numeral 45 is a supporter which is secured to the movable rail 30 to pivotally support a forward end portion of the operation shaft 43. Although not shown in the drawing, a wire extends from the lever 44 to a control lever (not shown) which is pivotally connected to a movable rail of the other elongate unit (not shown). A latch plate 46 with two latch pawls 46a is secured to the operation shaft 43 at the position between the two curled edge portions 42 of the base bracket 41. The latch pawls 46a are shaped and sized to be latchingly and selectively engageable with the notches 25 of the stationary rail 20. When the control lever mounted on the other elongate unit is pivoted in a direction to pull the wire, the lever 44 and thus the operation shaft 43 are rotated in a direction to disengage the latch pawls 46a of the latch plate 46 from the notches 25 of the stationary rail 20. As is seen from FIG. 3, a coil spring 47 is disposed about a rearward end portion of the operation shaft 43 to bias the same in a direction to achieve the latching engagement between the latch plate 46 and the notches 25.

As is best understood from FIG. 1, the front leg member 50a is arranged to support the front portion of the stationary rail 20 on the vehicle floor. That is, the leg member 50 comprises an upper flat portion (no numeral) welded to the bottom wall 21 of the stationary rail 20 and a stand portion 51a extending obliquely downward from the upper flat portion to the vehicle floor. Although not shown, a bolt or the like is used for detachably connecting the stand portion 51a to the vehicle floor.

The rear leg member 50b is arranged to support the rear portion of the stationary rail 20 on the vehicle floor. The leg member 50b comprises generally a rectangular portion 51 welded to the stationary rail 20 and a circular base portion 55 which is to be bolted to the vehicle floor. As is seen from FIG. 1, the rectangular portion 51 extends rearward from the rear end of the stationary rail 20. The leg member 50b is formed with a flange 52 which extends entirely along the periphery thereof. As is best understood from FIG. 4, the rectangular portion 51 is formed with a catching portion (no numeral) which grasps the stationary rail 20. As is seen from FIG. 1, the rectangular portion 51 has at its rear upper part a lug 53 below which one of the flanges 34 of the movable rail 30 extends when the rail 30 is slided rearward to assume its rear position relative to the stationary rail 20. The circular base portion 55 is integrally connected to the rectangular portion 51 through an obliquely extending intermediate portion (no numeral). The circular base portion 55 is formed at its mounting part 56 with a circular opening 56a through which a connecting bolt (not shown) is to be passed.

In the following, operation of the seat slide device 10 of the first embodiment will be described.

For ease of understanding, the description will be commenced with respect to a condition wherein the movable rail 30 is locked at a desired position relative to the stationary rail 20. Under this condition, the latch pawls 46a of the latch plate 46 are in latching engagement with selected two of the notches 25 of the stationary rail 20, so that the movable rail 30 and thus the seat mounted thereon can not move.

When now the control lever mounted on the other elongate unit (not shown) is manipulated to pivot in a given direction, the operation shaft 43 is rotated against the biasing force of the coil spring 47 in a direction to disengage the latch pawls 46a of the latch plate 46 from the selected notches 25 of the stationary rail 20. Thus, thereafter, the movable rail 30 is movable forward and rearward relative to the stationary rail 20. Thus, with the control lever (not shown) kept pushed, the movable rail 30 and thus the seat can be slided to a desired new position.

When the seat comes to the new position, the control lever is released. With this, the latch pawls 46a of the latch plate 46 are brought into latching engagement with new two of the notches 25 of the stationary rail 20. When the latch pawls 46a fail to make engagement with the notches 25, the seat is slided slightly forward or rearward. With this, the latching engagement is achieved. Thus, the seat is locked at the new position.

When, as is seen from FIG. 1, the seat comes to its rear end, the rear portion of the movable rail 30 is considerably projected from the stationary rail 20. Under this condition, the lug 53 of the leg member 50b extends over the flange 34 of the movable rail 30. It is thus to be noted that when, due to a vehicle collision or the like, the rear portion of the movable rail 30 is applied with a big force in a direction away from the stationary rail 20, the upward movement of the rear portion of the movable rail is suppressed by the lug 53. Thus, the dangerous disengagement of the movable rail 30 from the stationary rail 20 is prevented.

It is to be noted that when the seat assumes its $ foremost position, the movable rail 30 is substantially entirely engaged with the stationary rail 20. In this condition, the coupling between the two rails 20 and 30 is assuredly made.

Referring to FIGS. 5 and 6, there is shown a second embodiment of the present invention. As shown, the rear leg member 50b employed in this embodiment is formed with a lug 53 the leading end of which is bent downward to form a flange 53a. As is understood from FIG. 6, due to the provision of the flange 53a, the disengagment of the movable rail 30 from the stationary rail 20 is more assuredly prevented. That is, upon the vehicle collision, the flange 34 of the movable rail 30 becomes interlocked with the flange 53a of the lug 53 thereby suppressing the disengagement of the two rails 20 and 30.

Figure 7:
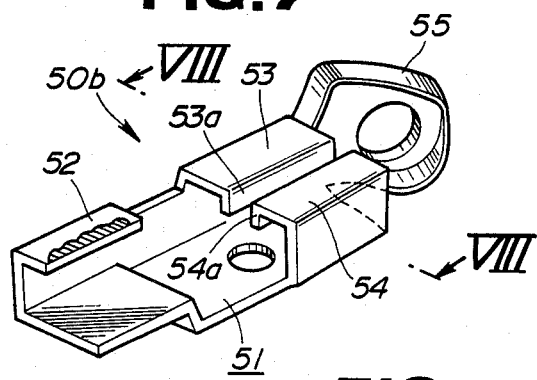
FIG. 7 is a partial perspective view of a seat slide device which is a third embodiment of the present invention.
Figure 8:
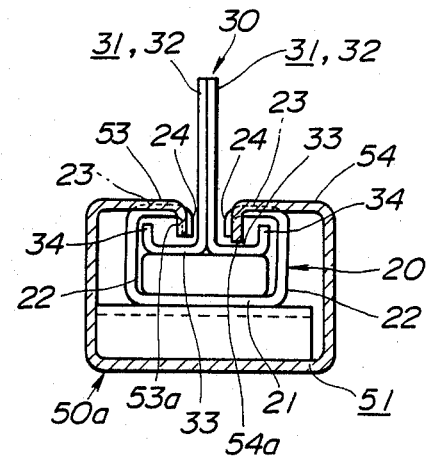
FIG. 8 is a sectional view taken along the line "VIII—VIII" of FIG. 7.

Referring to FIGS. 7 and 8, there is shown a third embodiment of the present invention. The rear leg member 50b employed in this embodiment comprises a rectangular portion 51 which is welded at the flange 52 to the rear end of the stationary rail 20 (not shown) and a circular base portion 55 which is to be bolted to the vehicle floor. The rectangular portion 51 is formed with a channel portion which comprises an apertured bottom wall (no numeral), opposed side walls (no numerals), upper walls 53 and 54 defining therebetween an axially extending slot, and flanges 53a and 54a inwardly projected from the upper walls 53 and 54. As is seen from FIG. 8, when the movable rail 30 assumes the rear position, the lower walls 33 and the flanges 34 of the movable rail 30 are received in the channel portion of the rear leg member 50b. When, due to a vehicle collision or the like, the movable rail 30 is applied with a big force in a direction away from the stationary rail 20, the upward movement of the rear end portion of the movable rail 30 is much more assuredly suppressed by the robustly constructed channel portion of the leg member 50b. Thus, the dangerous disengagement of the movable rail 30 from the stationary rail 20 is assuredly suppressed.

Although the above description is directed to the embodiments wherein the rectangular portion 51 is integral with the circular base portion 55, the rectangular portion 51 may be a separate member which is welded to the base portion 55.

What is claimed is:

1. A seat slide device comprising:
   a stationary rail securedly mounted on a fixed member;
   a movable rail slidable on and along said stationary rail while keeping an interlocking engagement with said stationary rail, said movable rail mounting thereon a seat and slidable to a given position wherein a longitudinal end portion of said movable rail is projected considerably from a corresponding end of the stationary rail;
   a leg member having one end secured to said corresponding end of said stationary rail and the other end secured to the fixed member; and
   a structure defined by said leg member, said structure having a projected portion which is placed above said longitudinal end portion of said movable rail when said movable rail comes to said given position.

2. A seat slide device as claimed in claim 1, in which said projected portion of said structure is arranged in such a manner that when said longitudinal end portion, of said movable rail is moved in a direction away from the bottom wall of said stationary rail, the same is brought into engagement with said projected portion of said structure.

3. A seat slide device as claimed in claim 2, in which said stationary rail is of a channel member which comprises a bottom wall, opposed side walls, upper walls defining therebetween an axially extending slot, and flanges inwardly projected from said upper walls toward said bottom wall, and in which said movable rail is shaped to have a generally T-shaped cross section comprising an axially extending base part, lower walls extending from said base part in opposite directions, and flanges upwardly projected from said lower walls, wherein said movable rail is engaged with said stationary rail in such a manner that the lower walls of said movable rail and the flanges of the same are received in said stationary rail and face toward the corresponding upper walls and flanges of said stationary rail.

4. A seat slide device as claimed in claim 3, in which said movable rail comprises two identical rail pieces each having a generally L-shaped cross section, wherein said identical rail pieces are secured to each other in a back-to-back manner.

5. A seat slide device as claimed in claim 4, in which said structure is a lug which is integrally formed on said leg member, said lug being placed on of said flanges possessed by said movable rail.

6. A seat slide device as claimed in 5, in which a leading end of said lug is bent downward to form a flange which is shaped to slidably interlock with the flange of said movable rail.

7. A seat slide device as claimed in claim 4, in which said structure is shaped like a channel member which comprises a bottom wall, opposed side walls, upper walls defining therebetween an axially extending slot, and flanges inwardly projected from said upper walls.

8. A seat slide device as claimed in claim 4, further comprising a slider mechanism which is interposed between said stationary and movable rails to smooth the sliding movement of said movable rail relative to said stationary rail.

9. A seat slide device as claimed in claim 8, in which said slider mechanism comprises roller bearings and ball bearings.

10. A seat slide device as claimed in claim 9, further comprising a lock mechanism which comprises:
    a base bracket secured to said movable rail to move therewith;
    an operation shaft supported by said base bracket in a manner to rotate about its axis;
    a latch plate secured to said operation shaft to move therewith; and
    means defining in said stationary rail a plurality of aligned notches to which said latch plate is latchingly engageable.

11. A seat slide device as claimed in claim 10, in which said operation shaft is biased by a spring in a direction to establish the latching engagement between said latch plate and said notches.

* * * * *